Nov. 10, 1959    C. J. HOPKINS    2,911,716
POWER OPERATED CLIPPING SHEARS
Filed April 9, 1958
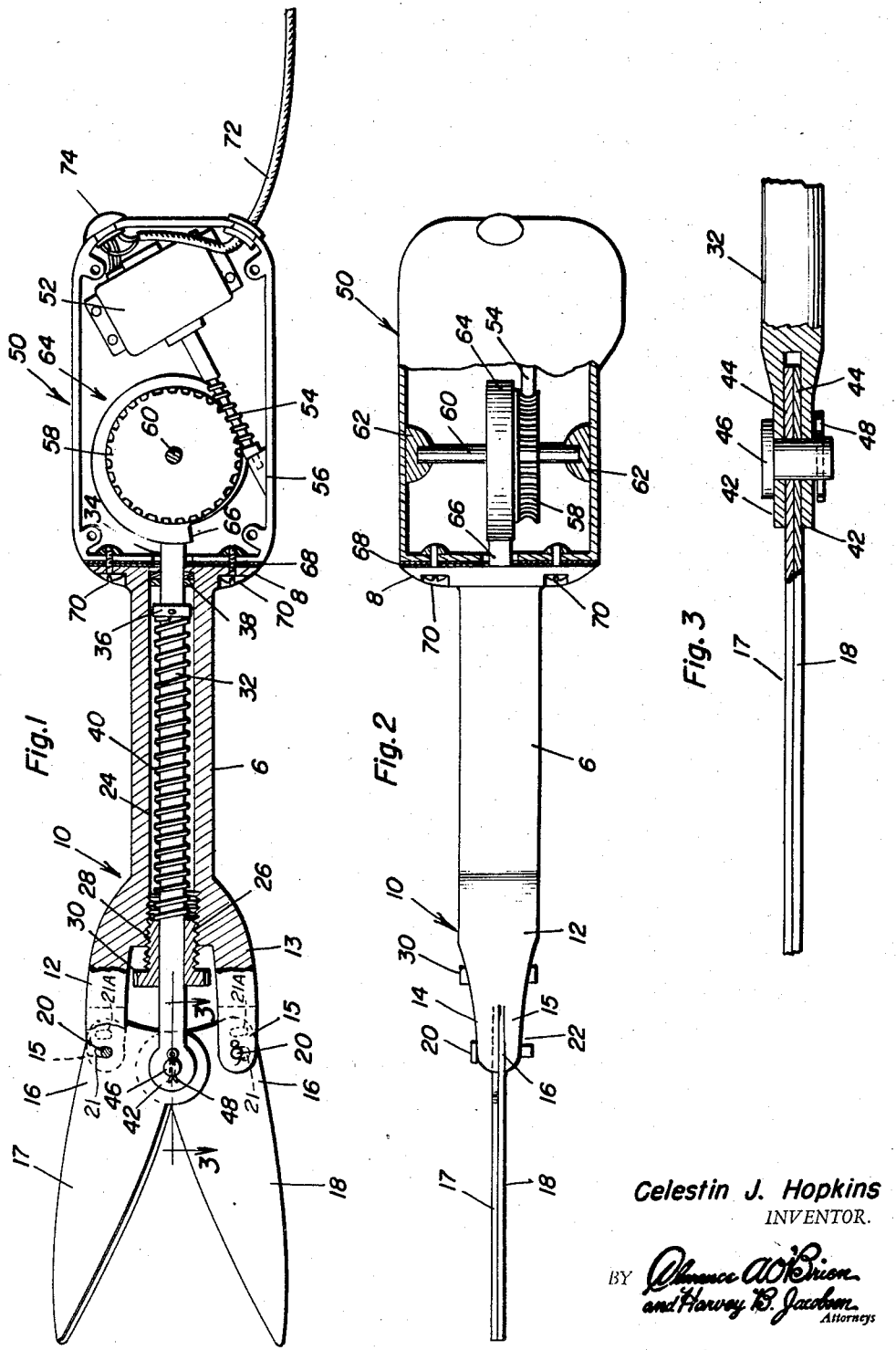
Celestin J. Hopkins
INVENTOR.

United States Patent Office 2,911,716
Patented Nov. 10, 1959

2,911,716
POWER OPERATED CLIPPING SHEARS
Celestin J. Hopkins, Port Angeles, Wash.
Application April 9, 1958, Serial No. 727,480
4 Claims. (Cl. 30—228)

The present invention relates to certain new and useful improvements in a powered hand-tool in the form of double blade cutting or clipping shears expressly, but not necessarily, adapted for cutting and trimming the marginal portion of grass on one's lawn.

There has existed a long felt need for a practical, positive-action powered hand tool for cutting grass. Manifestly, if not too complicated or too expensive, such a tool would be welcomed, to say the least, by most home owners. After much thought and a survey of those types of tools in the category under consideration which are most acceptable and usable, it is plain to be seen that the most satisfactory and successful way of cutting grass is with the form of tool having openable and closable shears or cutting blades. When done by hand the job is tedious and laborious. It follows that the instant concept has to do with an efficient power activated scissors-type clipping tool. To this end it has been decided to eliminate the crossed-type scissors and to concentrate on powering two-bladed shears wherein the blades are not crossed but are hinged on a handle and are joined together and activated by a blade opening and closing pin and a novel push-pull rod therefor.

Preliminary approaches kept involving powered action of various types to pull the blades closed and to open them with simple spring means. It was found that the closing action was usually slower than the opening action. However, what is wanted is the reverse so that the blades shut quickly and open progressively but deliberately. The danger of the user being injured by blades that are closed by powered action is apparent and appreciated. It is also realized that such powered cutting blades when closing on some foreign object or by way of clogging material therebetween would continue to close until the prime mover, usually an electric motor, stalls or some part of the linkage or mechanism breaks.

These and other lines of thought gave rise to designing the present invention in the firm belief that its action is basically correct when the powered action cycle or stage is used only to open the blades and reset a spring-triggered push-pull rod the function and action of which serves to close the blades. So constructed and made the improved shears can never become clogged or stopped up by anything that cannot be cut through but will immediately open again to release the obstruction or to enable one to try again to cut it. The closing action powered only by a spring is a quick, safe construction and reliable method of clipping. The clipping action can be adjusted to a wide range of spring tensions and the cutting blade slots or openings adjusted and positioned to suit the material being cut or to suit the safety conscious expectations of the cautious user.

In carrying out a preferred embodiment of the invention a suitable hollow handle is provided. This handle is of a shape and size to be conveniently grasped and used. A pair of complemental cutting blades are hingedly mounted at their inward ends on the distal or outer end of the handle. An encased prime mover, an electric motor for example, is mounted for operation on the proximal or inner end of the handle. Novel operating means is provided between the prime mover and blades, said means serving first to spread and open the blades by power delivered positively and directly from the prime mover to the blades and serving, secondly, and intermittently to quick-close the blades during which closing step or movement the power cycle and attending drive-action is momentarily released, whereby the blades are opened progressively but deliberately and yet are closed speedily and quickly without ever overloading or damaging the motor and the connection of the motor to the blades.

More explicitly novelty is predicated upon the means stated above which embodies a power-pushed spring retracted push-pull rod mounted for reciprocation in the handle and having its forward end pivotally joined to overlapping cooperating inner end portions of the blades with the overlapping portions in axial alignment with the handle and with the hinged portions to the right and left of the pivoted overlapping portions.

Other objects, features and advantages will become more readily apparant from the following description and the accompanying drawing.

In the drawing, wherein like numerals are employed to designate like parts throughout the views:

Fig. 1 is a bottom plan view with portions broken away and appearing in section and wherein all of the components and their association and arrangement is illustrated, making up the automatically operable shears herein under consideration;

Fig. 2 is a side or edge view of the construction seen in Fig. 1 and with portions of the gear box or motor housing broken away; and Fig. 3 is a view partly in section and partly in elevation showing the bifurcated end of the push-pull rod and how the overlapped portions of the cutting blades are operatively pivoted between the furcations.

Referring now to the drawing the hollow cylindrical handle seen in Figs. 1 and 2 is denoted at 6 and has an open ended bore. There is an outstanding lateral flange 8 at the proximal or inward end. There is a suitable head 10 at the forward or distal end and the head is preferably in the form of a fork and the arms of the fork are denoted by the numerals 12 and 13. As better shown in Fig. 2 the outer ends of the arms are bifurcated and the furcations 14 and 15 straddle the adjacent end portions 16 of the paired cutting blades or shears 17 and 18. The end portions 16 are mounted hingedly by the headed hinge pins 20 held in place by cotter keys 22. It follows that the blades 17 and 18 are thus hinged on the arms of the fork head to the left and right of the axis of the bore 24 of the handle. At the juncture of the head and handle the bore is internally screw threaded as at 26 to accommodate the external screw threads on a bushing 28 which is screwed in place in the manner seen in Fig. 1 and which has a suitably made finger-grip accessible at 30. The tapering of the fork arms as seen in Fig. 2 makes it easy to catch hold of and to turn the bushing. The bushing in turn provides a bearing for a cooperating portion of the push-pull rod or plunger 32. This rod is of a length greater than the length of the bore and the inner end portion 34 projects to the right beyond the bore as seen in Fig. 1. Adjacent to this end there is a stop collar 36 suitably secured by a setscrew or the like on the push rod and confined in the bore and movable toward and from cushioning washers or the like 38 which partially absorb shock. The required coil spring 40 is confined in the bore and encircles the rod and bears at one end against the collar 36 and at the other end against the bushing. By adjusting the bushing the tension of the coil spring can be regulated as is obvious. The projecting end portion of the push-pull rod is bifurcated as shown and the furcations (Fig. 3) 42 are generally circular in plan and are apertured and straddle the overlapping portions 44 of the blades which are sandwiched and pivoted between the furcations. There is a headed assembly pin 46 provided here and it extends through holes in the furcations and holes in the blades and is held in position by a cotter key 48.

The motor housing or gear box is of any suitable sectional construction and is denoted as a unit by the numeral 50. A suitable electric motor 52 is confined therein and drives a worm shaft 54 journaled at one end in a suitable bearing 56 (Fig. 1). The gear and cam means comprises a worm gear 58 keyed for rotation on a suitable shaft 60 freely turnable in bearings 62 (Fig. 2). This gear is combined with a cam into a single unit and the cam is denoted at 64 and is a perimeterous spiralling type as best seen in Figs. 1 and 2 with the projecting or terminal portion denoted at 66. This cam obviously has wiping and operating contact with the cooperating end portion 34 of the spring biased push-pull rod or plunger. The numerals 68 designate shims and 70 suitable fasteners which serve to join the flanged end 28 of the handle to the cooperating end portion of the gear housing. The cushioning washers 38 are there to take care of the recoil action as is obvious.

Reverting to the mode of hinging the blade portions 16, it should be noted that two sets or pairs of openings are provided; namely, the outer ones 21 through which the hinge pins 20 have been passed (in the manner shown Fig. 1) and the inner ones 21a which may be brought into use when necessary or desired. It follows that since these openings 21 and 21A are properly elongated, the necessary operating play between parts is effectually had.

In operation it can be readily seen that when the spiral-perimetered friction cam is in a position (see Fig. 1) where its maximum terminal portion 66 is in contact with the end of the push-pull rod, the shear blades will be forced open. As the turn of the gear continues the end of the push-pull rod suddenly returns to the minimum point of the spiral by way of the release of the tensioned spring and the blades are then closed. As the gear continues to turn it will thus activate the push-pull rod 32 longitudinally each time it revolves, said gear receiving its thrust or operating action through the worm gear from the fractional horsepower electric motor. The gear ratio and pitch of teeth in the worm gear and shaft should be such that when the motor is running at normal speed the spiral perimetered gear will be revolving at approximately 150 revolutions per minute. An electric extension cord 72 serves to supply current to the electric motor through or by way of a variable speed switch 74 so that the action of clipping can be changed to suit each individual operator. The casing 50 as before stated is preferably made in two separate parts fastened together by screws. It is obvious that other modifications of gearing could be used to turn the gearing and that such possible gearing, if properly powered, could turn the gears slow enough that more than one "hump" could be built on the perimeter to activate the push-pull rod a like number of times during each revolution.

Although efforts have been made by others working with powered tools, it will be evident by comparing that the instant construction is safer for the operator since the blades are not closed by any geared power action, but only by the action of released tension of the coil spring actuated push-pull rod properly and adjustably mounted in the hollow handle. The construction shown has immediate action on its closing movement and deliberate action on its powered action of opening. In certain known prior art adaptations both closing and opening speeds are the same and a continuation of the same geared or direct speed action. The transmission and release of power is herein effectually activated by practical and better mechanical means and use of forces and in such a manner that the problem of clogging or breaking the equipment by way of foreign objects is virtually eliminated. It is further emphasized that the blades are activated by power by way of the center pin connection between the blades and the spring biased push-pull rod. This is an improvement over any similar adaptation or arrangement requiring the use of activation of handles connected to crossed blades of the well known scissors-type.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Automatically operable shears for use by hand comprising a handle, a pair of cutting blades having limited inner end portions overlapping each other in alignment with the axis of said handle, one blade being hingedly mounted on the distal end of the handle to the left of the axis of the handle, the other blade being likewise hingedly mounted but to the right of said axis, an encased prime mover mounted for operation on the proximal end of said handle, operating means between the primer mover and blades, said means serving first to spread and open the blades by power delivered positively and directly from the prime mover to the blades and serving, secondly, and intermittently to quick-close the blades during which closing step the power cycle and attending drive-action is momentarily released, whereby said blades are opened progressively but deliberately but are closed speedily and quickly without ever overloading the motor, said operating means embodying a power-pushed spring-retarded push-pull rod mounted for reciprocation in the bore of said handle, the forward end of said rod being pivotally connected to the overlapping portions of said blades so that when the rod slides and projects forwardly the blades spread apart and open, and when the rod slides rearwardly and retracts the blades come together and close; a coil spring cooperating with the rod and handle for retracting the rod; and power driven means carried by the handle for projecting the rod and tensioning and cocking said spring, said power driven means comprising an encased electric motor the casing of which is mounted on the proximal end of said handle, a gear mounted for rotating in the casing and having a marginal cam having cooperative driving and releasing engagement with the adjacent end of said rod, and an operating connection between the motor and gear.

2. Automatically operable shears comprising a tubular handle the ends of the bore of which are open, the distal end of said handle having a forked head, one fork arm being situated to the left of the axis of the bore and the other fork arm to the right of said axis, a pair of cutting blades, having end portions adjacent to said head and hinged for cooperative opening and closing movement on their respective fork arms, portions of said blades between said arms overlapping each other in alignment with the axis of said bore, a bushing adjustably mounted in the leading end of said bore and providing a rod bearing, a push-pull rod slidable back and forth in the bearing and bore of said handle, the leading end of said rod being bifurcated, the furcations which are thus provided embracing and being pivotally joined to said overlapping blade portions, the trailing end of said rod projecting through and beyond the corresponding end of said bore for actuation, a coil spring in the bore encircling the rod and bearing at one end against the bushing and at the other end against a stop-collar provided therefor on said rod, and automatically operable means mounted on the proximal end of said handle for alternatively pushing said rod to tension and cock the spring and then releasing said spring and rod.

3. The structure defined in claim 2, and wherein said means comprises a gear box removably bolted on the handle, a gear mounted for rotation in said gear box and having a spiral-perimeter-cam marginally cooperable with the adjacent end of said push-pull rod, an electric motor confined in said gear box, and a worm-shaft carried and operable by said motor and meshed with said gear.

4. An automatically operable pair of shears comprising a tubular handle having a bore extending therethrough, the distal end of said bore having a bearing, said distal end also having a fork head embodying fork arms, one fork arm situated to the left of the axis of said bore and the other fork arm to the right of said axis, a pair of cutting blades having portions thereof overlapping each other in a position between the respective fork arms, the end portions of said blades adjacent to said fork arms having elongated selectively usable pairs of slots, one slot of each pair on each blade being separably and hingedly connected to the cooperating end portion of the associated fork arm, a push-pull rod slidable back and forth in the bore of said handle with the distal end operable in the bearing at the distal end of the handle, said distal end being bifurcated, the furcations being pivotally joined to said overlapping blade portions, the trailing end of said rod projecting through and beyond the corresponding end of the bore, a coil spring in said bore encircling a rod and under tension and bearing at one end against said bearing and the other end against a stop shoulder which is provided on said rod and which is confined for operation in the adjacent end portion of said bore, an automatically operable means mounted on the proximal end of said handle for alternatively pushing said rod to tension and cock the spring and then releasing the spring and rod, said means comprising a gear box removably bolted on the proximal end of the handle, a gear mounted for rotation in said gear box and having a spiral-perimeter-cam marginally cooperable with the adjacent end of said push-pull rod, an electric motor confined for operation in said gear box, and a worm shaft carried by said motor and operably engaged with said gear.

References Cited in the file of this patent

UNITED STATES PATENTS

| | | |
|---|---|---|
| 912,408 | Place | Feb. 16, 1909 |
| 2,348,895 | Gaudio | May 16, 1944 |
| 2,580,831 | Persak | Jan. 1, 1952 |
| 2,777,196 | Zoetemelk | Jan. 15, 1957 |